(12) United States Patent
Hishon

(10) Patent No.: US 6,237,959 B1
(45) Date of Patent: May 29, 2001

(54) HYDRAULIC VELOCITY DAMPER

(75) Inventor: Michael K. Hishon, New Baltimore, MI (US)

(73) Assignee: Autoliv ASP, Inc., Ogden, UT (US)

(*) Notice: Subject to any disclaimer, the term of this patent is extended or adjusted under 35 U.S.C. 154(b) by 0 days.

(21) Appl. No.: 09/457,160

(22) Filed: Dec. 8, 1999

(51) Int. Cl.⁷ .................................................. B60R 22/34
(52) U.S. Cl. ............................................. 280/807; 242/381
(58) Field of Search .................... 280/807, 806; 242/381, 381.1, 381.2, 381.3, 381.4, 381.5, 381.6; 74/424, 8 B

(56) References Cited

U.S. PATENT DOCUMENTS

| | | | |
|---|---|---|---|
| 260,366 | * 7/1882 | Burr | 74/424.8 B |
| 3,178,225 | 4/1965 | Bayer . | |
| 3,220,747 | * 11/1965 | Marion | 280/807 |
| 3,323,749 | * 6/1967 | Karlsson . | |
| 3,633,966 | 1/1972 | Epple et al. . | |
| 3,811,702 | 5/1974 | Kurasawa et al. . | |
| 3,881,667 | 5/1975 | Tandetzke . | |
| 3,970,266 | * 7/1976 | Doin et al. . | |
| 4,056,242 | * 11/1977 | Herrmann . | |
| 4,142,692 | 3/1979 | Andres . | |
| 4,234,210 | * 11/1980 | McNally et al. . | |
| 4,447,017 | * 5/1984 | Inukai | 280/806 X |
| 4,524,851 | * 6/1985 | Sawano et al. . | |
| 5,026,248 | * 6/1991 | Hamilton . | |
| 5,605,202 | 2/1997 | Dixon . | |
| 5,899,114 | * 5/1999 | Dolata et al. | 74/424.8 B |
| 6,065,704 | * 5/2000 | Pywell et al. | 280/806 |

FOREIGN PATENT DOCUMENTS

11334531 * 12/1999 (JP) .

* cited by examiner

Primary Examiner—Brian L. Johnson
Assistant Examiner—Bryan Fischmann
(74) Attorney, Agent, or Firm—Sally J. Brown

(57) ABSTRACT

A hydraulic velocity damper for use in a seat belt retractor system to control and limit the maximum velocity of seat belt payout during loading. The seat belt webbing payout is independent of the amount of load applied to a spindle body of the hydraulic velocity damper. In one embodiment, two pistons within an elliptical housing of a rotatable spindle body rotate about two independent drive screws. As the pistons rotate about respective drive screws, the pistons move towards each other to pressurize a hydraulic fluid within a chamber defined by the housing. At a predetermined pressure, a web covering at least one metering hole in each piston ruptures and the hydraulic fluid is positively displaced from within the chamber into an inner cavity of each piston. The rate at which the spindle body rotates is limited by the fluid displacement, regardless of the pressure within the chamber.

17 Claims, 8 Drawing Sheets

HYDRAULIC VELOCITY DAMPER

BACKGROUND OF THE INVENTION

This invention relates generally to a hydraulic velocity damper and, more particularly, to a hydraulic velocity damper for use with a seat belt retractor system to control and limit the maximum velocity of seat belt webbing payout during loading.

Conventional load limiting devices are load dependant. These devices allow a seat belt webbing to payout at different velocity rates when various loads are applied to the device. Optimum performance of these conventional systems is targeted to a specifically sized occupant, i.e., an average sized occupant. However, when a smaller occupant, i.e., a small child, or a larger occupant, i.e., a large adult, is positioned within the conventional seat belt retractor system, less than optimum control of webbing payout results. Webbing payout is reduced for smaller occupants due to the relatively smaller force applied by the smaller occupant to the system during rapid deceleration. Conversely, the webbing payout is increased for larger occupants due to the relatively larger force applied by the larger occupant to the system. Thus, conventional load limiting devices fail to provide adequate control of seat belt payout for different sized occupants.

SUMMARY OF THE INVENTION

A general object of the invention is to provide an improved velocity damper such as for use in a seat belt retractor system.

A more specific objective of the invention is to overcome one or more of the problems described above.

The general object of the invention can be attained, at least in part, through a hydraulic velocity damper having a rotatable spindle body having at least one open end and at least in part defining an irregularly shaped housing. The housing, at least in part, defines a chamber that is adapted to hold a fluid. The chamber has a fluid passage to allow fluid to be displaced from within the chamber. A drive screw is positioned within the housing and two rotatable, irregularly shaped pistons are threadedly connected with the drive screw. An end cap, connected to a head portion of the drive screw, is mounted to the spindle body and covers an open end of the spindle body.

The prior art generally fails to provide a seat belt retractor apparatus which limits the velocity of seat belt webbing payout during loading as effectively as desired.

The invention further comprehends a spindle body at least in part defining an elliptical housing. The housing at least in part defines a chamber adapted to contain a fluid. A drive screw having a body section with a first end portion and an opposite second end portion is positionable within the housing. One of the first and second end portions of the drive screw has clockwise threads and the other end portion has counterclockwise threads. An elliptical first piston is threadedly connected with the first end portion and an elliptical second piston is threadedly connected with the second end portion. The housing has at least one fluid passage to allow fluid to be displaced from within the chamber.

The invention still further comprehends a spindle body at least in part defining an elliptical housing which at least in part defines a chamber. A first drive screw is positioned within a first end portion of the housing and a second drive screw is positioned within an opposite second end portion of the housing. The two drive screws are oppositely threaded.

A first piston is threadedly connected with the first drive screw and is moveable along a length of the first drive screw. Similarly, a second piston is threadedly connected with the second drive screw and is moveable along a length of the second drive screw. The two pistons and an inner wall of the housing define a chamber which holds or contains hydraulic fluid. The hydraulic fluid is displaced from within the chamber into an inner cavity of each piston through at least one metering hole in each piston.

As used herein, references to "fluid" are to be understood to refer to any material or substance that changes shape or direction uniformly in response to an external force imposed upon it. The term applies not only to liquids, but also to gases and finely divided solids, for example. Fluids are broadly classified as Newtonian and non-Newtonian depending on their obedience to the laws of classical mechanics.

As used herein, references to "Newtonian fluid" are to be understood to refer to a fluid's ability to flow, a property depending largely on its viscosity and sometimes also on the rate of shear. A Newtonian fluid is a fluid that flows immediately on application of force and for which the rate of flow is directly proportional to the force applied. Water, gasoline, and motor oils at high temperatures are examples of traditional Newtonian fluids.

Further, references herein to "Non-Newtonian fluid" are to be understood to refer to fluids which have an abnormal flow response when force is applied, that is, the fluid's viscosity is dependent on the rate of shear. Such fluids are said to exhibit Non-Newtonian flow properties. For example, some Non-Newtonian fluids will not flow until a force greater than a definite value called the yield point is applied to the fluid.

As used herein, references to "fluid-tight" are to be understood to refer to the chamber having minimal fluid leakage between the piston seal and the inner wall of the housing when in a non-pressurized state or condition and, for pressurized operation, at selected corresponding or associated pressures, dependent on the specific application design. For example, in particular embodiments, such "fluid-tight" arrangements desirably avoid fluid leakage at operating pressures up to at least about 20,000 psi or more and, more preferably, desirably avoid fluid leakage at operating pressures up to about 30,000 psi or more.

Other objects and advantages will be apparent to those skilled in the art from the following detailed description taken in conjunction with the appended claims and drawings.

DETAILED DESCRIPTION OF THE INVENTION

Figure 1:
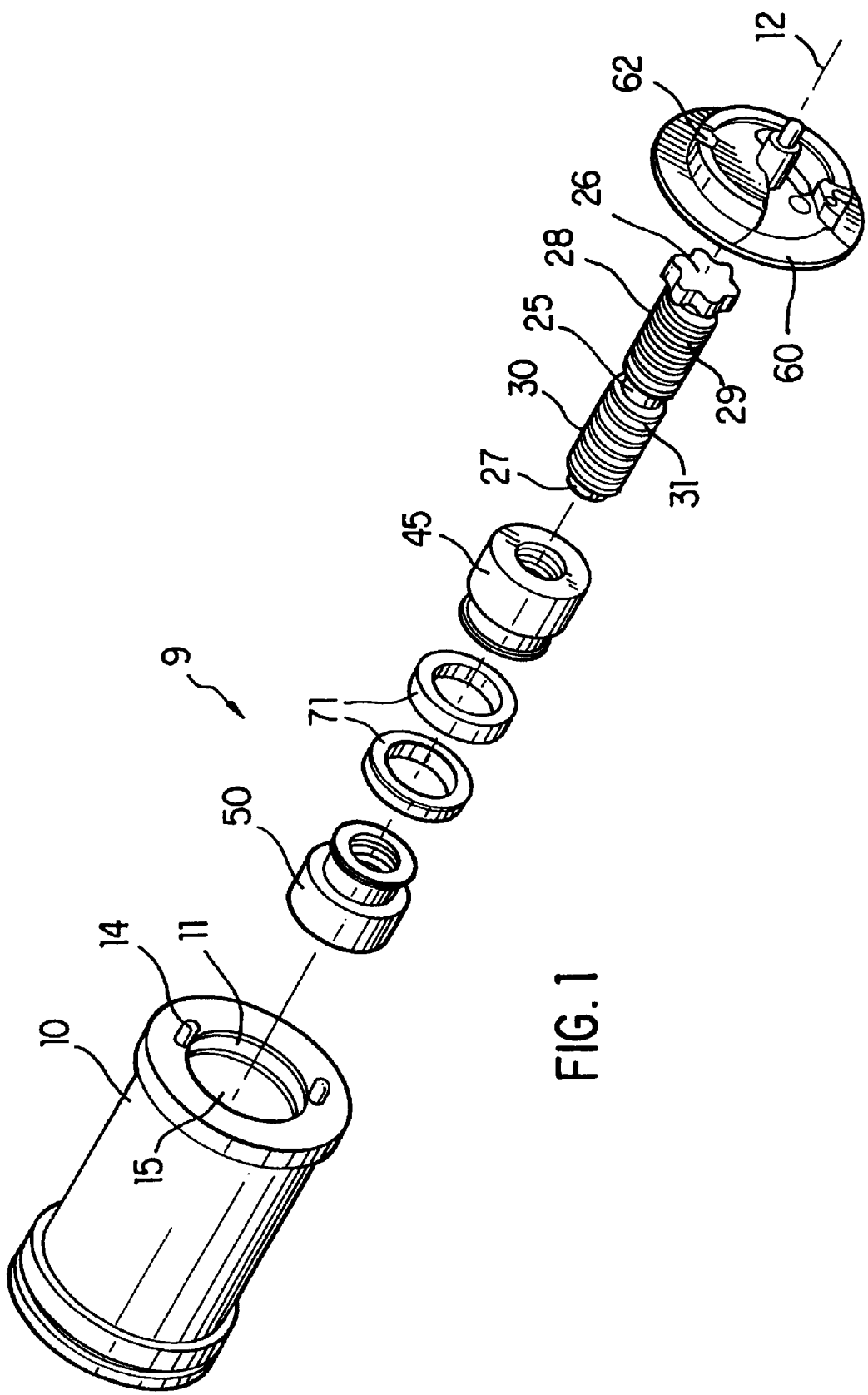
FIG. 1 is an exploded perspective view of a hydraulic velocity damper, according to one preferred embodiment of this invention.
Figure 2:
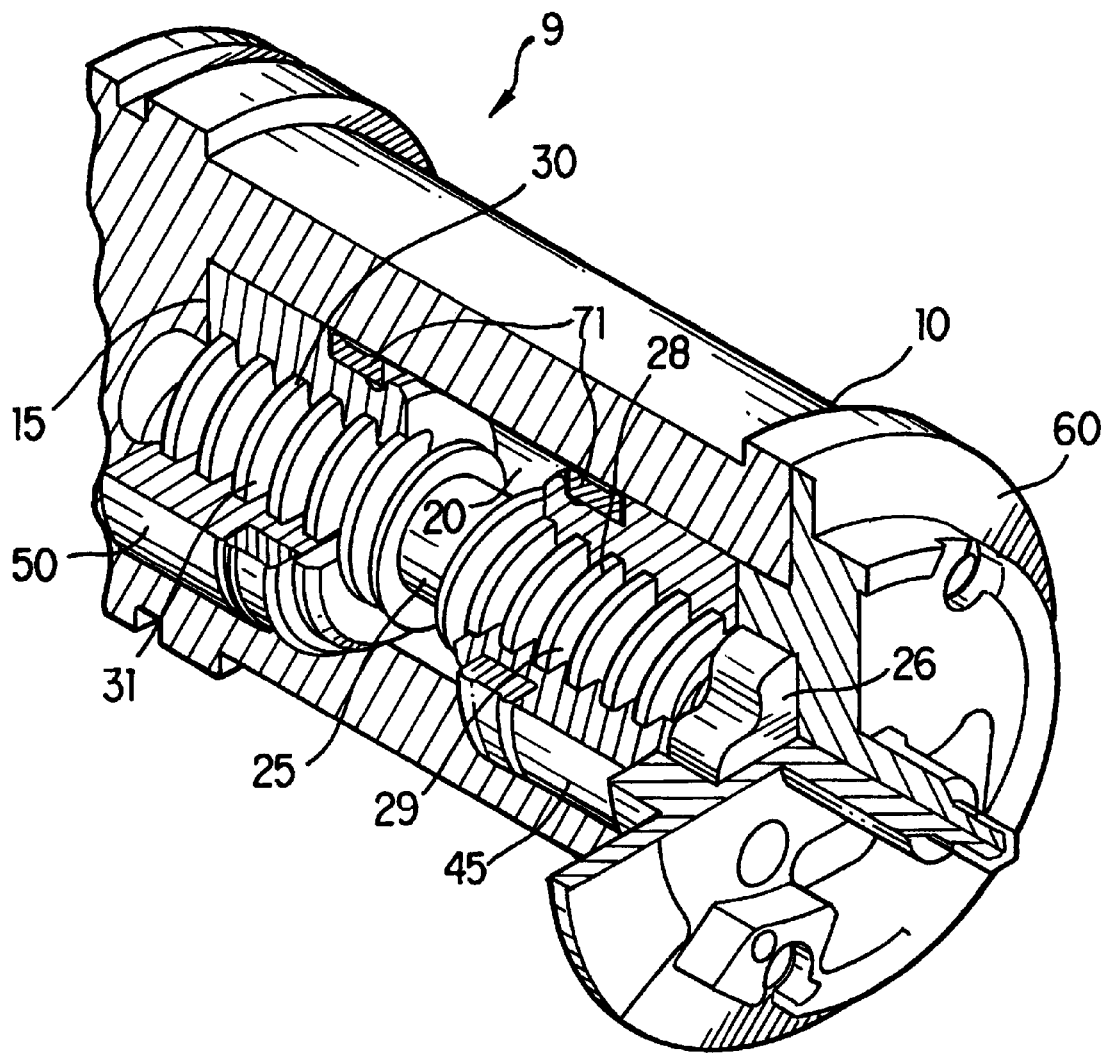
FIG. 2 is a cross-sectional perspective view of a hydraulic velocity damper, according to one preferred embodiment of this invention.
Figure 3:
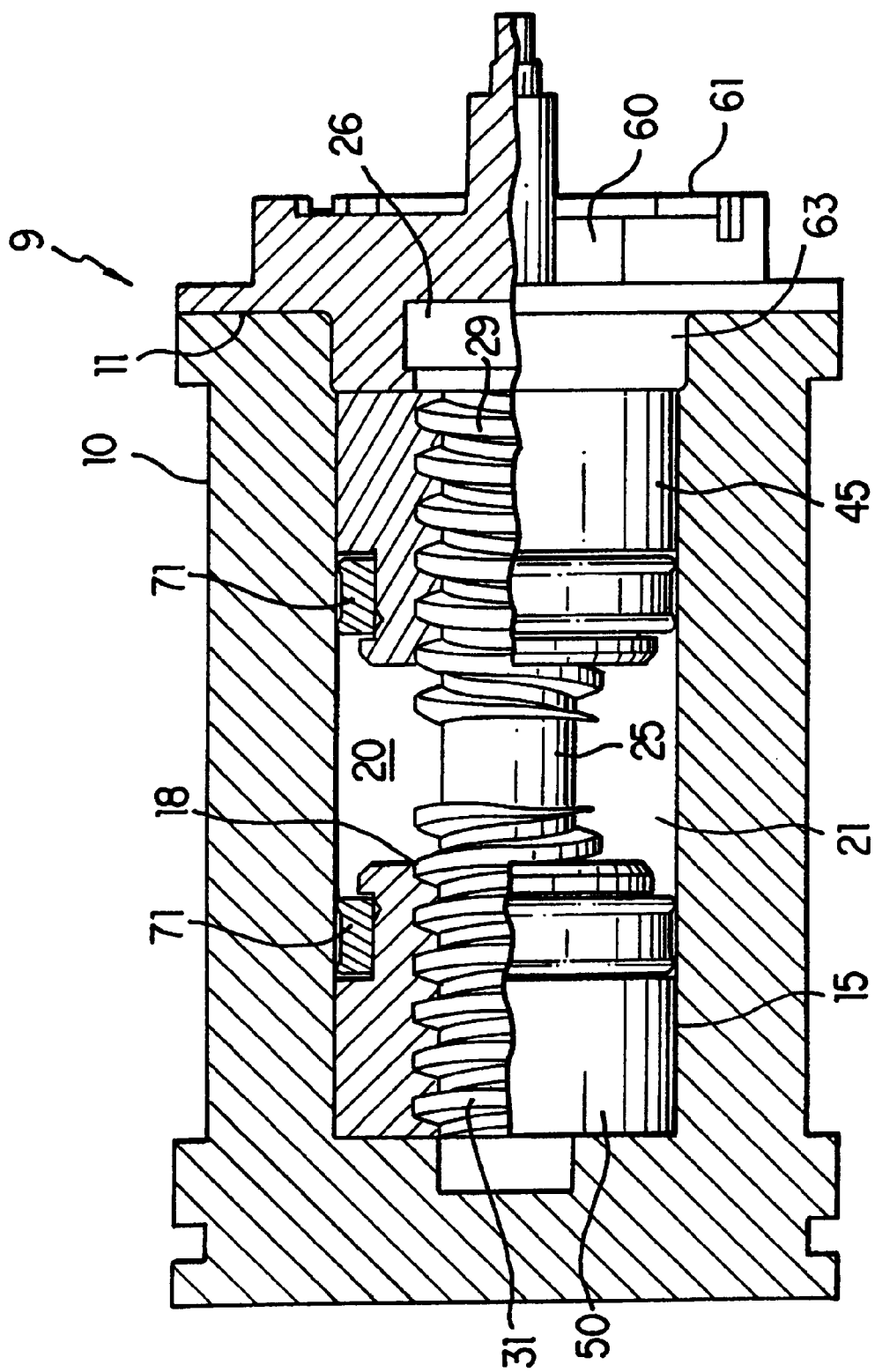
FIG. 3 is a cross-sectional side view of a hydraulic velocity damper, according to one preferred embodiment of this invention.

The present invention provides a hydraulic velocity damper 9 for use with, for example, a seat belt retractor system. As shown in FIG. 1, the hydraulic velocity damper 9 comprises a rotatable spindle body 10, according to one preferred embodiment of this invention. The spindle body 10 has at least one open end 11 and at least in part defines a housing 15. The housing 15 has an irregularly shaped cross section, for example, an elliptically shaped cross section. However, the housing 15 may have any suitable cross-sectional shape known in the art. As shown in FIGS. 2 and 3, the housing 15 at least in part defines a chamber 20 adapted to hold or contain a fluid, as discussed below. The housing 15 has at least one fluid passage 18, as shown in FIG. 3, to allow fluid to be displaced from within the chamber 20.

A drive screw 25 is housed or positioned within the housing 15 and has a head section or portion 26 and a body section 27. The body section 27 has a first end portion 28 having a set of threads 29 and a second end portion 30 having a set of threads 31. Preferably, one of the set of threads 29 and the set of threads 31 are helically oriented in a clockwise direction with respect to a longitudinal axis 12, as shown in FIG. 1, and the other set of threads 29 and set of threads 31 are helically oriented in a counterclockwise direction with respect to the longitudinal axis 12.

An irregularly shaped first piston 45 is threadedly connected with the drive screw first end portion 28 and is rotatable about the first end portion 28. The first piston 45 has an elliptical cross-sectional shape fittable or positionable within at least a portion of the housing 15. The first piston 45 may have any suitable cross-sectional shape known in the art. The first piston 45 is rotatable, along with the spindle body 10, with respect to the drive screw 25. As the first piston 45 rotates about the first end portion 28, the first piston 45 moves along a length of the drive screw first end portion 28.

Similarly, an irregularly shaped second piston 50 is threadedly connected with the drive screw second end portion 30. The second piston 50 has an elliptical cross-sectional shape fittable or positionable within at least a portion of the housing 15. Like the first piston 45, the second piston 50 can have any suitable cross-sectional shape that is positionable within the housing 15. The second piston 50 is rotatable about the second end portion 30. As the first piston 45 and the second piston 50 rotate about the drive screw 25, the second piston 50 moves along a length of the second end portion 30 in a direction opposite a direction in which the first piston 45 moves along the length of the first end portion 28.

For example, as shown in FIG. 3, when the spindle body 10 rotates in a counterclockwise direction with respect to a front face 61 of the end cap 60, the first piston 45 rotates about the drive screw 25 in a counterclockwise direction and the first piston 45 moves along the length of the first end portion 28 in a direction towards the second piston 50. The second piston 50, similarly, rotates about the drive screw 25 in a counterclockwise direction, however, the second piston 50 moves along the length of the second end portion 30 in a direction opposite the direction in which the first piston 45 moves, i.e., towards the first piston 45. As the spindle body 10 rotates about the drive screw 25, a volume 21 within the chamber 20, defined by an inner wall of the housing 15 and pistons 45 and 50, decreases.

Conversely, when the spindle body 10 rotates in a clockwise direction with respect to the front face 61 of end cap 60, the first piston 45 moves along the first end portion 28 in a direction away from the second piston 50 and the second piston 50 moves along the second end portion 30 in a direction opposite the direction in which the first piston 45 moves, i.e., away from the first piston 45. Thus, the volume 21 within the chamber 20 increases.

As shown in FIGS. 2 and 3, the end cap 60 is mated or connected to the head section 26 of the drive screw 25 and mounted with respect to the open end 11. The end cap 60 covers the open end 11 to enclose the housing 15. Preferably, a portion 63 of the end cap 60 is positionable within a portion of the open end 11 and tightly encloses the housing 15. Preferably, but not necessarily, as shown in FIG. 1, the end cap 60 comprises at least one aperture 62 which is mateable with at least one corresponding boss 14 of the spindle body 10 to secure the end cap 60 onto the spindle body 10. The end cap 60 is locked in a stationary position by a spindle frame (not shown). With the end cap 60 locked in a stationary position, the spindle body 10 will not rotate about the drive screw 25. When a sufficient torque is applied to the spindle body 10, the boss 14 is sheared, and the spindle body 10 rotates about the drive screw 25.

In one preferred embodiment of this invention, a piston seal 71 is positioned around each of the first piston 45 and the second piston 50. The piston seal 71 have a pressure range of up to about 30,000 psi. Preferably, but not necessarily, the piston seals 71 provide a "fluid-tight" chamber 20. The minimal leakage of fluid from the chamber 20 does not effect the performance of the hydraulic velocity damper 9.

Figure 4:
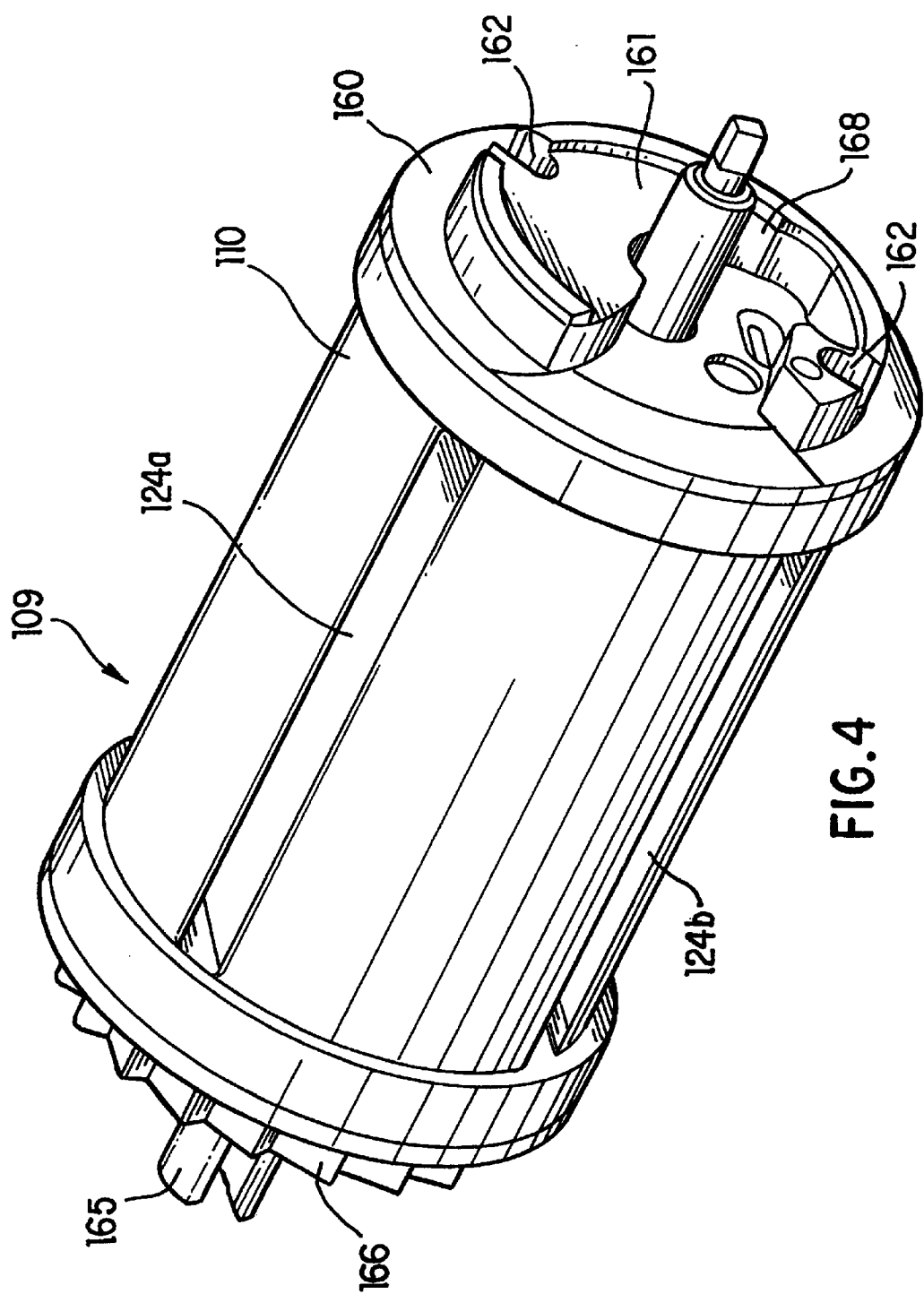
FIG. 4 is perspective view of a hydraulic velocity damper, according to one preferred embodiment of this invention.
Figure 5:
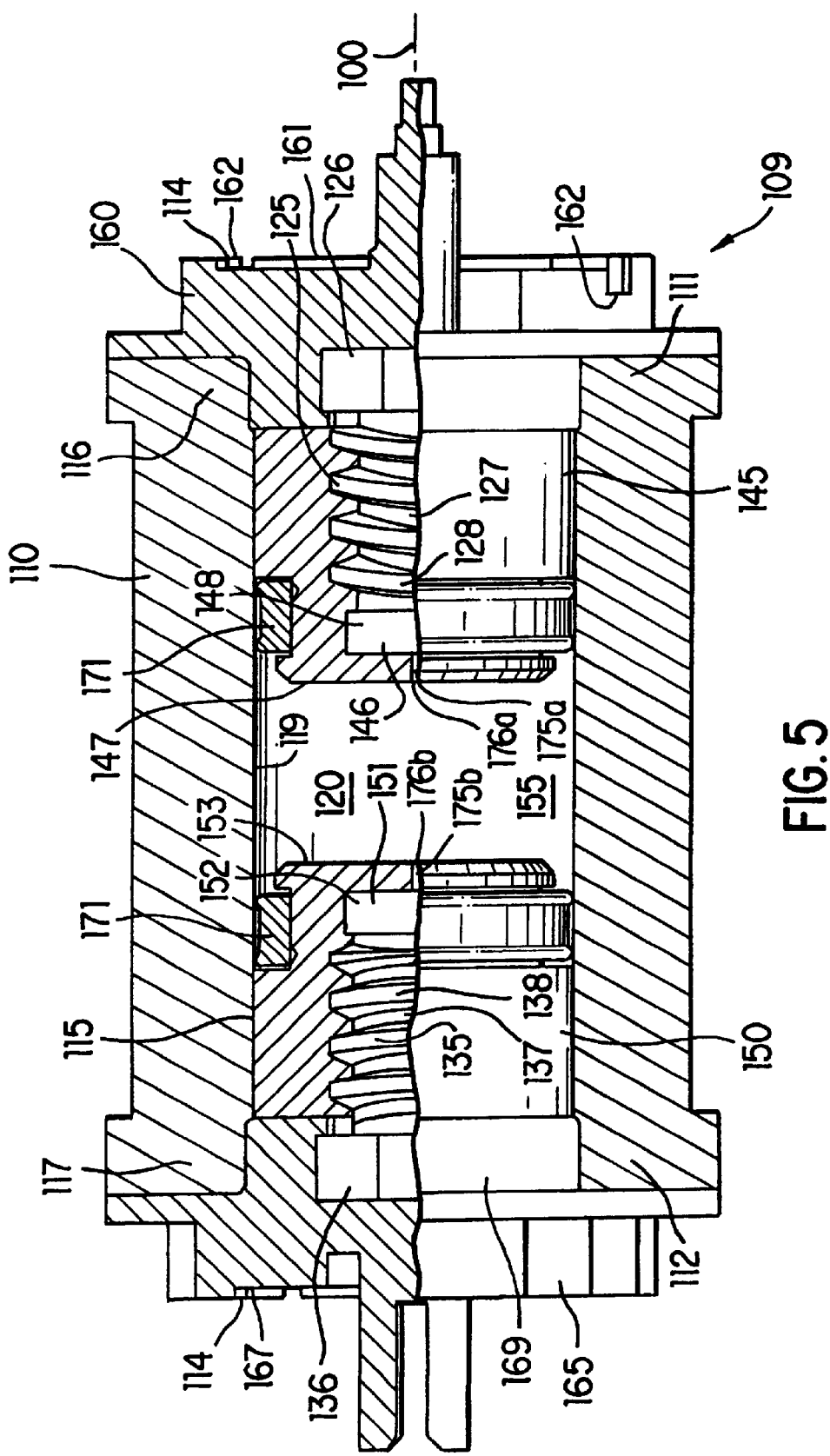
FIG. 5 is a cross-sectional side view of a hydraulic velocity damper, according to one preferred embodiment of this invention.
Figure 6:
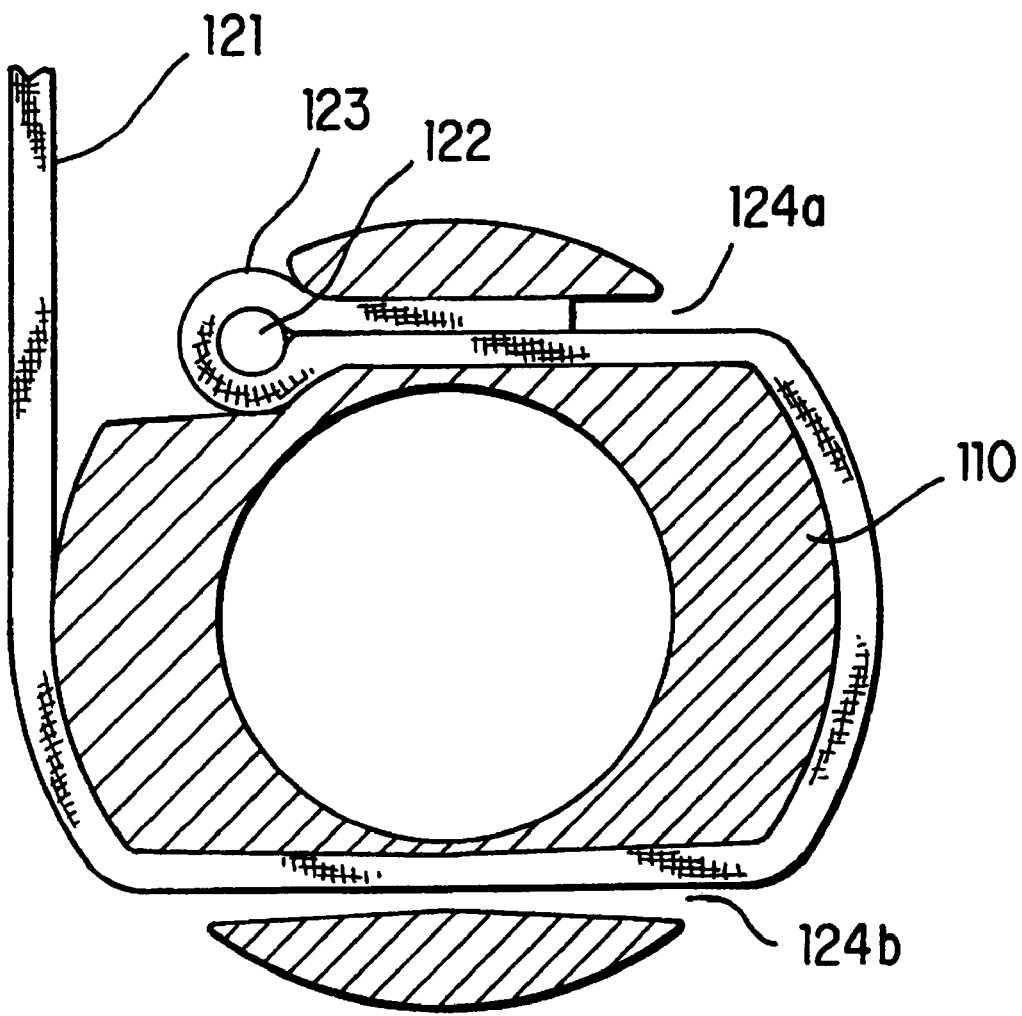
FIG. 6 is a cross-sectional front view of a seat belt webbing secured to a spindle body, according to one preferred embodiment of this invention.

In another preferred embodiment according to this invention, as shown in FIGS. 4–6, a hydraulic velocity damper 109, similar to the hydraulic velocity damper 9, comprises a spindle body 110, similar to the spindle body 10. As shown in FIG. 6, a seat belt webbing 121 is securely connected to the spindle body 110 by conventional means. For example, a webbing pin 122 is inserted into a loop 123 of the seat belt webbing 121 and the seat belt webbing 121 is inserted into a slot 124a of the spindle body 110 to anchor the loop 123. The seat belt webbing 121 exits the spindle body 110 through a slot 124b.

The spindle body 110 comprises a first open end 111 and an opposite second open end 112 and at least in part defines an irregularly shaped housing 115 having a first end portion 116 and a second end portion 117. The housing 115 may have any suitable cross-sectional shape known in the art. The housing 115 at least in part defines a chamber 120 adapted to bold or contain a fluid, preferably a hydraulic fluid.

A first drive screw 125 is positioned within the housing 115 at the first end portion 116. The first drive screw 125 has a head portion or section 126 and a body section 127. At least a portion of the body section 127 comprises a set of threads 128. A second drive screw 135 is positioned within the housing 115 at the second end portion 117. The second drive screw 135 has a head portion or section 136 and a body section 137. At least a portion of the body section 137 comprises a set of threads 138. Preferably, one of the set of threads 128 and the set of threads 138 are helically oriented in a clockwise direction with respect to a longitudinal axis 100 and the other set of threads 128 and set of threads 138 are helically oriented in a counterclockwise direction with respect to the longitudinal axis 100, as shown in FIG. 5.

A first piston 145, similar to the first piston 45, is fitted or positioned within the housing 115 at the first end portion 116. The first piston 145 has an elliptical cross-sectional shape. The first piston 145 may have any suitable cross-sectional shape known in the art. The first piston 145 is threadedly connected with the first drive screw 125. The first piston 145 is rotatable about the first drive screw 125 and moveable with respect to a length of the first drive screw 125. Preferably, the first piston 145 has an inner cavity 146 as shown in FIG. 5. As the first piston 145 rotates about the first drive screw 125, the first piston moves along a length of the first drive screw 125 and a volume 148 within the inner cavity 146 changes. For example, as the spindle body 110 rotates in a counterclockwise direction, the first piston 145 rotates in counterclockwise direction and moves away from the first open end 111, as shown in FIG. 5. As the first piston 145 moves away from the first open end 111, the volume 148 within the inner cavity 146 increases.

A second piston 150, similar to the second piston 50 of the embodiment discussed above, is fitted or positioned within the housing 115 at the second end portion 117. The second piston 150 has an elliptical cross-sectional shape. However, the second piston 150 may have any suitable cross-sectional shape known in the art. The second piston 150 is threadedly connected with the second drive screw 135. The second piston 150 is rotatable about the second drive screw 135 and moveable with respect to a length of the second drive screw 135. Preferably, the second piston 150 has an inner cavity 151 as shown in FIG. 5. As the second piston 150 rotates about the second drive screw 135, the second piston moves along a length of the second drive screw 135 and a volume 152 within the inner cavity 151 changes. For example, as the spindle body 110 rotates in a counterclockwise direction, the second piston 150 rotates in counterclockwise direction and moves away from the open end 112, as shown in FIG. 5. As the second piston 150 moves away from the second open end 112, the volume 152 within the inner cavity 151 increases.

In one embodiment of this invention, the first piston 145 comprises at least one metering hole 175a and the second piston 150 comprises at least one metering hole 175b, as shown in FIG. 5. The metering hole 175a allows fluid communication between the chamber 120 and the inner cavity 146 of the first piston 145 and the metering hole 175b allows fluid communication between the chamber 120 and the inner cavity 151 of the second piston 150. Preferably, but not necessarily, the metering hole 175a is covered with a web 176a of piston material to prevent fluid from entering the metering hole 175a and moving between the chamber 120 and the inner cavity 146. Similarly, the metering hole 175b is covered with a web 176b of piston material to prevent fluid from entering the metering hole 175b and moving between the chamber 120 and the inner cavity 151. The webs 176a and 176b are ruptureable or breakable when the pressure within the chamber 120 reaches a predetermined pressure. When the webs 176a and 176b break, fluid is positively displaced from within the pressurized chamber 120 through the metering holes 175a and 175b into the inner cavities 146 and 151, A respectively. The dimensions of the metering holes 175a and 175b are designed so that as the fluid is forced through the metering holes 175a and 175b, the internal friction due to mechanical shearing of the fluid increases to limit the rate at which the fluid can pass through the metering holes 175a and 175b regardless of the pressure applied to the fluid. In one embodiment, a piston seal 171 is positioned around each of the first piston 145 and second piston 150. The piston seals 171 have a pressure range of up to about 30,000 psi to provide a "fluid-tight" chamber 120.

The hydraulic velocity damper 109 further comprises a fluid 155 contained within the housing 115. Preferably, a hydraulic fluid, for example, Dow Corning dielectric silicone gel available under the trade number Dow Corning #527 is contained within the chamber 120. Other fluids as defined above and well known to those having ordinary skill in the art may also be used including Newtonian and Non-Newtonian fluids and other materials having fluid properties or materials, when pressurized, displaying plastic flow. Preferably, the hydraulic fluid 155 is contained within the chamber 120 defined by the inner wall 119 formed by the spindle body 110 and a front face 147 of the first piston 145 and a front face 153 of the second piston 150.

Preferably, but not necessarily, the hydraulic fluid 155 is a Non-Newtonian fluid. The rate of displacement of a Non-Newtonian fluid is generally controllable regardless of the pressure applied to the fluid. Thus, the spindle body 110 reaches a maximum rate of rotation when a maximum flow rate of the hydraulic fluid 155 through the metering holes 175a and 175b is achieved. At a maximum flow rate, the hydraulic fluid 155 is displaced from within the chamber 120 into the inner cavities 146 and 151 at a constant rate regardless of the pressure within the chamber 120.

The rate of displacement of a Newtonian fluid, on the other hand, is directly proportionable to the pressure applied to the fluid. The flow rate of a Newtonian fluid through the metering holes 175a and 175b is a linear function of the pressure applied. Thus, as pressure within the chamber 120 increases, the flow rate or rate of displacement of the hydraulic fluid 155 through the metering holes 175a and 175b is increased. As a result when an increased torque is applied to the spindle body 110, the angular velocity of the spindle body 110 is also increased. Preferred Newtonian fluids include transmission fluid and petroleum-based fluids for example.

As shown in FIGS. 4 and 5, a first end cap 160 is mateable with the bead portion 126 of the first drive screw 125 and connected to the spindle body 110. A portion 163 of the first end cap 160 is fittable or positionable within a portion of the first open end 111 of the spindle body 110 to close the open end 111 and tightly seal the housing 115. Preferably, but not necessarily, the first end cap 160 comprises a lock pawl 161, as shown in FIGS. 4 and 5. The lock pawl 161 has a ratchet means 168 for engaging with the retractor frame of the seat belt retractor system.

As shown in FIGS. 4 and 5, a second end cap 165 is mateable with the head portion 136 of the second drive screw 135 and connected to the second end portion 117. A portion 169 of the second end cap 165 is fittable or positionable within a portion of the second open end 112 of the spindle body 110 to cover the open end 112 and tightly seal the housing 115. Preferably, the second end cap 165 comprises a plurality of teeth 166 engageable with the retractor frame of the seat belt retractor system.

In one embodiment, each of the first end 111 and the second end 112 of the spindle body 110 have at least one boss 114. The boss 114 of the first end 111 is mateable with at least one aperture 162 in the first end cap 160 and the boss 114 of the second end 112 is mateable with at least one aperture 167 in the second end cap 165. The bosses 114 secure the end caps 160 and 165 to the spindle body 110. During operation of the hydraulic velocity damper 109, the bosses 114 are shearable at a predetermined design load to allow the spindle body 110 to rotate with respect to the first and second drive screws 125 and 135.

In one embodiment, the spindle body 110 is rotatable about each of the stationary first drive screw 125 and second drive screw 135. During seat belt loading, torque is applied to the spindle body 110. The first end cap 160 and the second end cap 165 are engaged with the retractor frame to prevent rotation of the first and the second drive screw 125 and 135. The spindle body 110 rotates under the torque generated by the seat belt loading. Rotation of the spindle body 110 drives the first piston 145 and the second piston 150 along the length of the first and second drive screw 125 and 135 towards each other, pressurizing the hydraulic fluid 155 within the chamber 120. The hydraulic fluid 155 is positively displaced at a controllable velocity through the metering hole 175a into inner cavity 146 of first piston 145 and through metering hole 175b into inner cavity 151 of second piston 150. The controlled velocity of hydraulic fluid displacement limits the angular velocity of the spindle body 110 during seat belt loading, thereby controlling and limiting the maximum velocity that the seat belt webbing 121 can payout regardless of load applied to the system. In another embodiment, each of the first drive screw 125 and the second drive screw 135 is independently rotatable with respect to the stationary spindle body 110.

Figure 7:
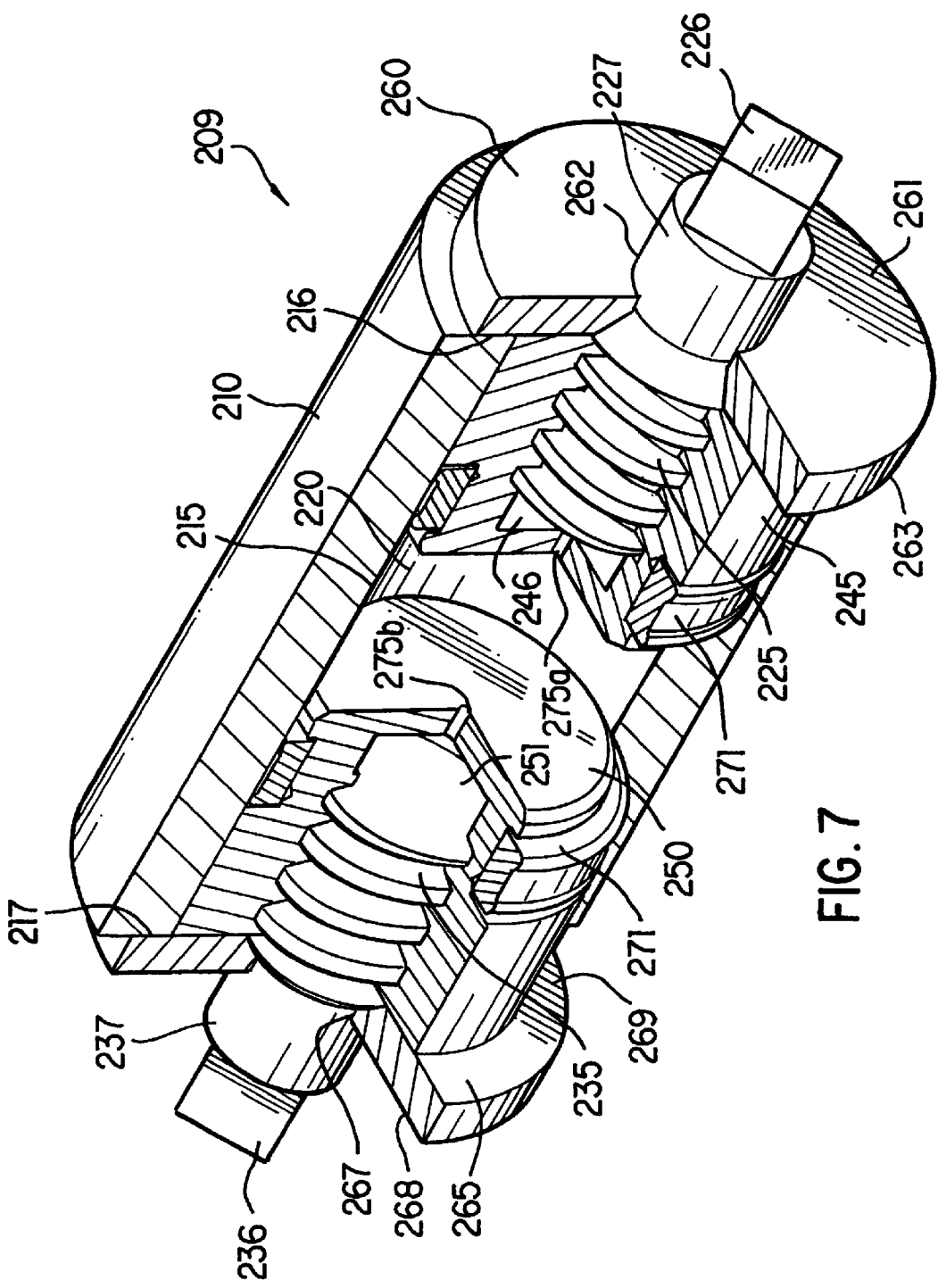
FIG. 7 is a cross-sectional perspective view of a hydraulic velocity damper, according to one preferred embodiment of this invention.
Figure 8:
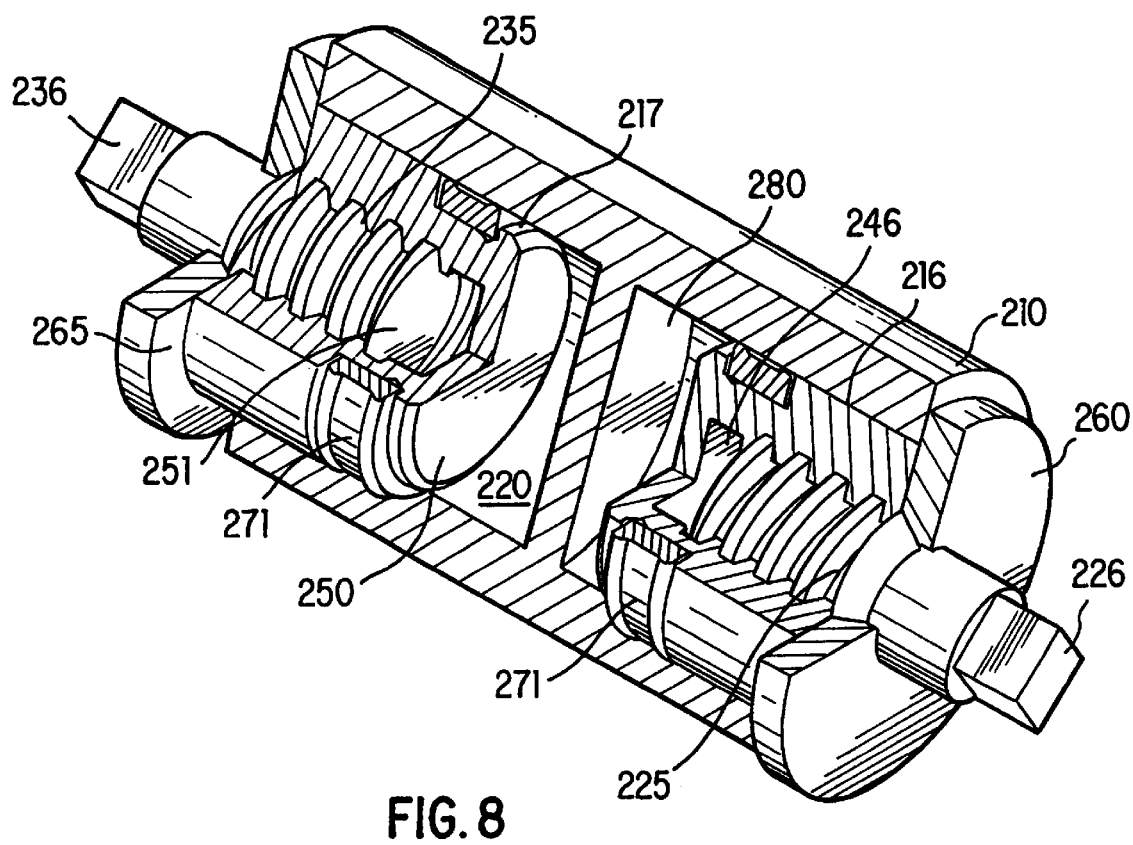
FIG. 8 is a cross-sectional perspective view of a hydraulic velocity damper having a divider positioned within a housing, according to one preferred embodiment of this invention.
Figure 1:
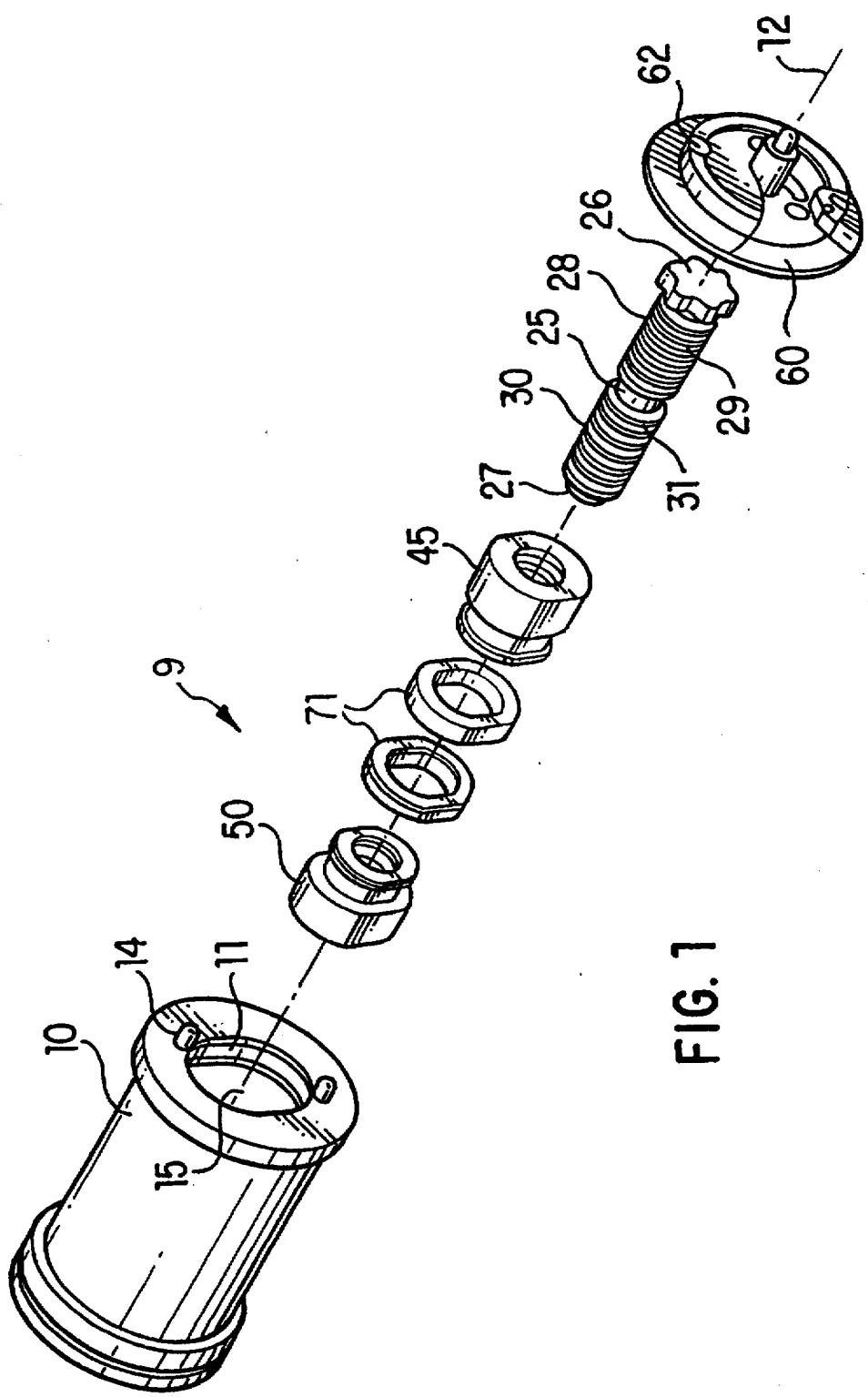
Figure 6:
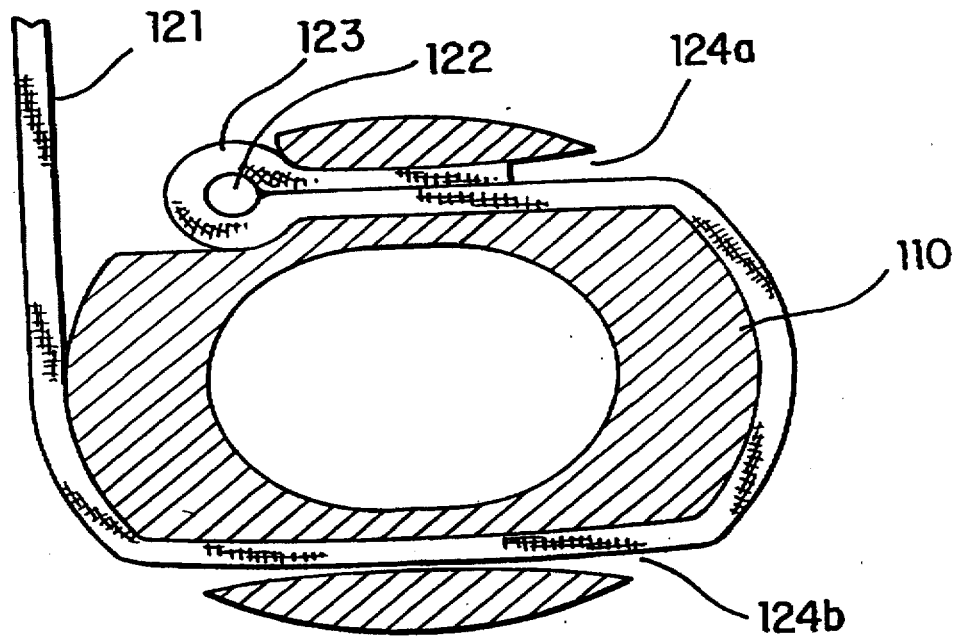

A hydraulic velocity damper 209 in accordance with another preferred embodiment is shown in FIGS. 7 and 8. The hydraulic velocity damper 209 includes a spindle body 210, which at least in part defines a housing 215 having a first end portion 216 and a second end portion 217, a first piston 245 with an inner cavity 246 and a metering hole 275a, a second piston 250 with an inner cavity 251 and a metering hole 275b, and seals 271. The housing 215 at least in part defines a chamber 220, similar to the chamber 120 described above. A first end cap 260 has a flat or smooth front surface 261 and a flat or smooth back surface 263. A second end cap 265 has a flat or smooth front surface 268 and a flat or smooth back surface 269. The end caps 260 and 265 are connected to the end portions 216 and 217, respectively, by means well known to those having ordinary skill in the art, for example the end caps 260 and 265 may be welded to the end portions 216 and 217.

The first end cap 260 has an aperture 262 and the second end cap 265 has an aperture 267. A head portion or section 226 of a first drive screw 225 is positionable within the aperture 262 of the first end cap 260 and a head portion or section 236 of a second drive screw 235 is positionable within the aperture 267 of the second end cap 265. Preferably, in this embodiment, the head portion 226 and the head portion 236 have a rectangular shape. The head portions 226 and 236 can have other suitable shapes well known in the art. The first end cap 260 and the second end cap 265 are connected to the spindle body 210 so that a portion 227 of the first drive screw 225 and a portion 237 of the second drive screw 235 extend outwardly from the housing 215. The first head portion 226 and the second head portion 236 are engageable with the retractor frame. Preferably, but not necessarily, a divider 280 is positioned within the housing 215 to prevent fluid communication between the first end portion 216 and the second end portion 217 of the housing 215. The divider 280 provides balance to the hydraulic velocity damper 209 to increase its performance.

Thus, the invention provides a hydraulic velocity damper for use in seat belt retractor system to control and limit the maximum velocity of seat belt webbing payout during loading. The seat belt webbing payout is independent of the amount of load applied to the spindle body of the hydraulic velocity damper. The maximum velocity of fluid displacement can be set for a loading condition of a small occupant and as the applied load increases with the size of the occupant, the rate of fluid displacement remains constant, when a Non-Newtonian liquid is used for the hydraulic fluid.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

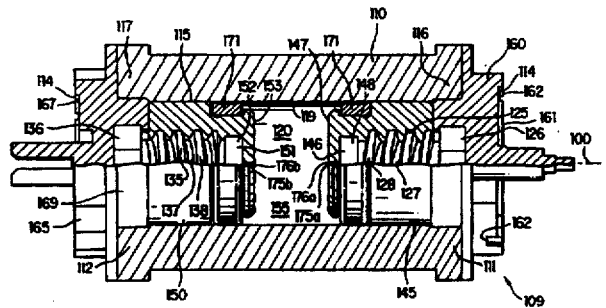

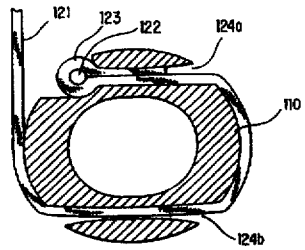

What is claimed is:

1. A hydraulic velocity damper, comprising:
   a rotatable spindle body at least in part defining an irregularly shaped housing having at least one open end, the housing at least in part defining a chamber adapted to hold a fluid, the housing having at least one fluid passage to allow fluid to be displaced from within the chamber;
   a drive screw having a head portion, the drive screw positioned within the housing;
   an irregularly shaped first piston threadedly connected with the drive screw and rotatable about the drive screw;
   an irregularly shaped second piston threadedly connected with the drive screw and rotatable about the drive screw; and
   an end cap connected to the head portion of the drive screw and mounted to the open end of the spindle body, the end cap covering the open end.

2. The hydraulic velocity damper of claim 1 wherein the chamber is fluid-tight.

3. The hydraulic velocity damper of claim 1 further comprising a piston seal positioned about each of the first and second pistons to provide a fluid-tight chamber.

4. In a seat belt retractor system having a seat belt, a hydraulic velocity damper, comprising:
   a spindle body having an open end and at least in part defining an elliptical housing, the housing at least in part defining a chamber adapted to contain a fluid, the housing having at least one fluid passage to allow fluid to be displaced from within the chamber;
   a drive screw having a head portion and a body section, the body section positioned within the housing, the body section having a first end portion and an opposite second end portion, one of the first and the second end portion having clockwise threads and the other of the first and the second end portion having counterclockwise threads;
   an elliptical first piston threadedly connected with the first end portion of the body section, the first piston rotatable about the drive screw;
   an elliptical second piston threadedly connected with the second end portion of the body section, the second piston rotatable about the drive screw; and
   an end cap connected to the head portion of the drive screw and connected to the open end of the spindle body to enclose the housing.

5. A hydraulic velocity damper, comprising:

a spindle body having an elliptical housing with a first end portion and a second end portion, the housing at least in part defining a chamber;

a first drive screw positioned within the first end portion of the housing;

a second drive screw positioned within the second end portion of the housing, one of the first and the second drive screw having clockwise threads and the other of the first and the second drive screw having counter-clockwise threads;

an elliptical first piston fitted within the housing and threadedly connected with the first drive screw, the first piston moveable with respect to a length of the first drive screw;

an elliptical second piston fitted within the housing and threadedly connected with the second drive screw, the second piston moveable with respect to a length of the second drive screw;

a first end cap mateable with a head portion of the first drive screw and connected to the first end portion of the housing;

a second end cap mateable with a head portion of the second drive screw and mounted to the second end portion of the housing; and a hydraulic fluid contained within the chamber.

6. The hydraulic velocity damper of claim 5 wherein the first end cap comprises a lock pawl, the lock pawl engageable with a retractor frame.

7. The hydraulic velocity damper of claim 5 wherein the first end portion has at least one boss mateable with at least one aperture in the first end cap and the second end portion has at least one boss mateable with at least one aperture in the second end cap.

8. The hydraulic velocity damper of claim 7 wherein the at least one boss is shearable at a predetermined design load.

9. The hydraulic velocity damper of claim 5 wherein the second end cap has a plurality of teeth engageable with a retractor frame.

10. The hydraulic velocity damper of claim 5 wherein each of the first piston and the second piston has at least one metering hole, the at least one metering hole allows fluid communication between the chamber and an inner cavity of each of the first piston and the second piston.

11. The hydraulic velocity damper of claim 10 wherein a web covers each of the at least one metering hole in each of the first piston and the second piston preventing fluid from entering the metering hole.

12. The hydraulic velocity damper of claim 11 wherein the web is ruptureable at a predetermined pressure within the chamber.

13. The hydraulic velocity damper of claim 5 wherein each of the first and second end caps has an aperture, the head portion of the first drive screw positioned within the aperture of the first end cap and the head portion of the second drive screw positioned within the aperture of the second end.

14. The hydraulic velocity damper of claim 13 wherein the head portion of the first drive screw and the head portion of the second drive screw is engageable with a retractor frame.

15. The hydraulic velocity damper of claim 13 wherein the housing is rotatable with respect to the first drive screw and the second drive screw.

16. The hydraulic velocity damper of claim 13 wherein each of the first drive screw and the second drive screw is independently rotatable with respect to the housing.

17. The hydraulic velocity damper of claim 13 wherein a divider is positioned within the housing to prevent fluid communication between the first end portion and the second end portion.

\* \* \* \* \*

UNITED STATES PATENT AND TRADEMARK OFFICE
CERTIFICATE OF CORRECTION

PATENT NO.     : 6,237,959 B1
DATED          : May 29, 2001
INVENTOR(S)    : Michael Hishon It is certified that error appears in the above-identified patent and that said Letters Patent is hereby corrected as shown below:

Title page,
The title page, showing the illustrative figure, should be deleted and substitute therefore the attached title page.

Drawings,
The drawing sheets, consisting of Figs. 1 and 6, should be deleted to be replaced with the drawing sheets, consisting of Figs. 1 and 6, as shown on the attached pages.

Signed and Sealed this

Twenty-eighth Day of May, 2002

*Attest:*

*Attesting Officer*

JAMES E. ROGAN
*Director of the United States Patent and Trademark Office*

(12) United States Patent
Hishon

(10) Patent No.: US 6,237,959 B1
(45) Date of Patent: May 29, 2001

(54) HYDRAULIC VELOCITY DAMPER

(75) Inventor: Michael K. Hishon, New Baltimore, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/457,160

(22) Filed: Dec. 8, 1999

(51) Int. Cl.[7] ................................................ B60R 22/34
(52) U.S. Cl. ........................................... 280/807; 242/381
(58) Field of Search ................................ 280/807, 806; 242/381, 381.1, 381.2, 381.3, 381.4, 381.5, 381.6; 74/424, 8 B

(56) References Cited

U.S. PATENT DOCUMENTS

| | | | |
|---|---|---|---|
| 260,366 | * | 7/1882 | Burr .............................. 74/424.8 B |
| 3,178,225 | | 4/1965 | Bayer . |
| 3,220,747 | * | 11/1965 | Marion ............................ 280/807 |
| 3,323,749 | * | 6/1967 | Karlsson . |
| 3,633,966 | | 1/1972 | Epple et al. . |
| 3,811,702 | | 5/1974 | Kurasawa et al. . |
| 3,881,667 | | 5/1975 | Tandetzke . |
| 3,970,266 | * | 7/1976 | Doin et al. . |
| 4,056,242 | * | 11/1977 | Herrmann . |
| 4,142,692 | | 3/1979 | Andres . |
| 4,234,210 | * | 11/1980 | McNally et al. . |
| 4,447,017 | * | 5/1984 | Inukai .......................... 280/806 X |
| 4,524,851 | * | 6/1985 | Sawano et al. . |
| 5,026,248 | * | 6/1991 | Hamilton . |
| 5,605,202 | | 2/1997 | Dixon . |
| 5,899,114 | * | 5/1999 | Dolata et al. ................. 74/424.8 B |
| 6,065,704 | * | 5/2000 | Pywell et al. .................... 280/806 |

FOREIGN PATENT DOCUMENTS

11334531  *  12/1999  (JP) .

* cited by examiner

Primary Examiner—Brian L. Johnson
Assistant Examiner—Bryan Fischmann
(74) Attorney, Agent, or Firm—Sally J. Brown

(57) ABSTRACT

A hydraulic velocity damper for use in a seat belt retractor system to control and limit the maximum velocity of seat belt payout during loading. The seat belt webbing payout is independent of the amount of load applied to a spindle body of the hydraulic velocity damper. In one embodiment, two pistons within an elliptical housing of a rotatable spindle body rotate about two independent drive screws. As the pistons rotate about respective drive screws, the pistons move towards each other to pressurize a hydraulic fluid within a chamber defined by the housing. At a predetermined pressure, a web covering at least one metering hole in each piston ruptures and the hydraulic fluid is positively displaced from within the chamber into an inner cavity of each piston. The rate at which the spindle body rotates is limited by the fluid displacement, regardless of the pressure within the chamber.

17 Claims, 8 Drawing Sheets